Patented Jan. 16, 1951

2,538,236

UNITED STATES PATENT OFFICE 2,538,236

INSULATING MATERIAL

Paul S. Denning, Joliet, Ill., assignor to F. E. Schundler & Co., Inc., Joliet, Ill., a corporation of Illinois No Drawing. Application April 24, 1944, Serial No. 532,530

3 Claims. (Cl. 154—44)

This invention relates to a refractory insulating material, and its manufacture, and among other objects aims to provide thermal insulating material of adequate strength and high insulating efficiency and capable of withstanding high temperatures. The present application is a continuation in part of my co-pending application (now abandoned) Serial 453,647. The latter application was a division of copending application Serial 340,454, filed June 14, 1940, Patent No. 2,311,588.

The nature of the invention may be readily understood by reference to one illustrative material and its manufacture embodying the invention and hereinafter described.

Heretofore there have been no practicable materials which possessed all of the following qualities: (1) good insulating efficiency at high temperature, e. g., K-factor of about .8 at 1200° F.; (2) refractoriness, i. e., ability to withstand without undue shrinkage temperatures in excess of 1800° F.; (3) adequate strength. Heretofore so-called refractory insulating materials have lacked one or more of the foregoing characteristics. Moreover, many materials which have high insulating efficiency at moderate temperatures become poor insulators at high temperatures due to the fact that their internal structure is not efficient against radiant heat which comprises most of the heat energy at high temperatures. Indeed the radiant heat constituent increases as the fourth power of the temperatures. A simple, though partial, explanation of inefficiency at high temperatures is that the voids or pores which give most materials their insulating efficiency at low temperatures, do not efficiently retard transmission or penetration of radiant heat because the latter is not transmitted by conduction through the dead air in the voids. Other efficient materials cannot be bonded together without losing their insulating efficiency.

The insulating ingredient of the present material is exfoliated vermiculite or the like. This material is the product of certain micaceous minerals which exfoliate or expand to many times their original size upon application of heat. The expressions "vermiculite" and "exfoliated vermiculite" will be used herein for convenience to designate these micaceous minerals, including but not limited to that specifically named vermiculite, capable of exfoliating or expanding upon application of heat. The resulting material is characterized by a multitude of slightly separated laminae which have a very high insulating efficiency against radiant heat in a direction perpendicular to the laminae but not in a direction parallel thereto. This is assumed to be due to the fact that transmission of radiant heat is retarded both by reflection from the multitude of polished laminae through which it must pass and by the multitude of alternate media through which it must pass. These media comprise the microscopically thin laminae most of which are very slightly separated. The degree of separation of the laminae is not important, it may be submicroscopic in size. It is effective so long as it obliges the radiant heat waves repeatedly to pass through a multitude of different media, first the thin laminae, and then the exceedingly small space between the laminae regardless of the thinness of the laminae or the spaces between the laminae. There is always loss of energy when any form of radiant energy must pass from one medium into another.

Attempts have been made, heretofore, to make molded insulation from bonded exfoliated vermiculite. For example in my Patent 2,204,581 a cement was utilized to bond granules of exfoliated vermiculite. Although this material was a distinct improvement over previous materials and although the amount of cement used was minimized, nevertheless its efficiency was reduced and at high temperatures its shrinkage was excessive. An improved material was disclosed in my said co-pending application and in my said Patent 2,311,588, by reducing the vermiculite to very fine flakes or laminae and felting them together in such manner as to permit reduction in bonding cement. The latter material while superior in insulating efficiency to that of my above patent, still required too much bonding cement to develop the necessary strength, despite the thoroughness with which the flakes and laminae of the vermiculite were felted together.

I have now discovered that a very great improvement in strength as well as other qualities presently described, may be obtained by the novel methods hereinafter described. First of all, I obtain a great increase in strength by treating the vermiculite flakes so as to increase their mutual friction on each other in their intimately felted relation in the product. Normally flakes of untreated exfoliated vermiculite have little friction on each other. On the contrary they act as a lubricant, and in flake form actually function as a lubricant similarly to flaked graphite. Hence though thoroughly felted together, the tendency of the flakes to slip on each other reduced the expected strength of the material. In the present case increase in mutual friction is made possible by modifying the surface of the vermiculite flakes to increase their friction and by treating the vermiculite to subdivide or split them into much thinner flakes than has heretofore been possible. The resulting flakes are more flexible and can therefore attain a much more intimate felting contact with each other. This coupled with their increased frictional resistance on each other greatly increases the strength of the product.

I have found that if cement be used to bond the vermiculite flakes together, the amount required so reduces the insulating efficiency of the material and increases its weight as largely to defeat the intended purposes of the material. A small amount of cement is used in the present product but it functions not as a conventional bonding agent but rather to maintain the high frictional contact between the laminae. In this it is much more efficient than a conventional bond produced by cement.

A further reduction in weight is effected during processing of the vermiculite by a two-step heat treatment. I have found that the raw vermiculite contains a substantial amount of feldspathic rock which lowers the fusion temperature of the vermiculite when the latter is exfoliated as heretofore, with the result that there is objectionable sintering and incipient fusion of the vermiculite.

According to the present process the vermiculite is exfoliated at temperatures (about 1200° F.) substantially below the temperatures at which the feldspathic rock is capable of producing any objectionable fusion. The vermiculite may advantageously be exfoliated in a furnace having an inclined heating chamber through which it tumbles freely in a relatively short time. The flame temperature in the exfoliating chamber may be relatively higher but the vermiculite is exposed for such a short time that it reaches only temperatures of the order of about 1200° F. This is not a critical temperature but in the exfoliating process herein employed the vermiculite should preferably not be heated to temperatures substantially above 1500° F.

In its condition as thus exfoliated the vermiculite is much lighter than the rock it contains, and the latter may be readily separated by blowing the vermiculite laterally with an air stream through a short distance in which the rock falls out and the lighter vermiculite traveling a farther distance free of the rock can collect in a storage space. The resulting vermiculites not only is substantially lighter in weight but being free of the low fusion feldspathic and other rock can now safely be given the subsequent heat treatment to develop the aforesaid friction surfaces on the laminae.

I have discovered that by heating the oxfoliated vermiculite to temperatures which would have produced fusion had the rock remained with the vermiculite, e. g., temperatures of the order of 1800–1900° F., the vermiculite laminae develop an unexpected friction surface which is utilized as above suggested to secure the great improvement in strength of insulating block and the like molded as presently described. This heat treatment is more prolonged than that required for exfoliating, and may advantageously take place in a rotary drum or tube wherein the temperatures are of the order of 1800–1900° F. The vermiculite is tumbled in the tube by rotation of the latter until it is thoroughly heated throughout. The temperatures inside the tube are preferably limited so that despite the heating for a substantial period of time none of the vermiculite is heated to temperatures substantially exceeding 1800–1900° F. The treating temperatures need not reach 1800° F. if the material be used at lower temperatures. Preferably the vermiculite is treated at temperatures reached in use, thereby reducing shrinkage of the material in use.

Thereafter the treated vermiculite is ground to reduce it to extremely thin flakes and laminae of such fineness (from 30 to 70% will pass through a 65 mesh screen) that they no longer have the ability to float on water.

The ground vermiculite is then mixed with water to produce a slurry of such thinness that the flakes of vermiculite are free to orient themselves and to settle (instead of float) in the mold. A small amount of cement forming material for the purposes above explained is incorporated in the slurry. In the present case calcium silicate cement is developed by reaction in the material. Calcium silicate is quite refractory, capable of withstanding 2700° F. and is formed in the present case by reaction of hydrated lime and silica. The silica is preferably in such form as to provide a large surface area and to permit the maximum intimacy of contact (for purposes of reaction) with the hydrated lime. One such form of silica is diatomaceous earth whose particles are characterized by a large surface area in relation to mass. The diatomaceous earth or silica and the hydrated lime are advantageously mixed in the slurry with the vermiculite. The use of cement-forming materials makes it possible, among other advantages, to make a freer filtering slurry by the use of a small amount of fibre such as asbestos fibre which acts both as a filter aid in de-watering the material and in some degree as a reinforcing. Such reinforcement is particularly desirable when blocks of such material need be cut partly through and slightly bent to apply them to irregular surfaces. The fibre prevents complete breakage of the material at the bend.

The aforesaid slurry is then molded or otherwise formed in such a way as to permit orientation of the vermiculite flakes so that they will lie transversely or perpendicularly to the direction of travel of the heat rays. For flat slabs of the material the flakes would lie parallel to a face of the slab, and for curved insulation, such as pipe insulation, the flakes would lie perpendicular to the radius, that is, parallel to the tangent to the curved surface.

According to one process for making the material, the slurry is introduced into a mold or the like and during de-watering the vermiculite flakes are maintained in such condition that they are free progressively to orient themselves and to settle into intimate interlocking or felting relationship with adjacent flakes. During this progressive orientation care is taken to eliminate forces which might disturb the vermiculite flakes and prevent their proper orientation. Moreover, during the progressive orientation and the extraction of water, entrance of air to replace the water is prevented; indeed as the water leaves the material it is replaced by oriented overlapping vermiculite flakes, with the result that substantial voids are eliminated. Large pores or voids are undesirable not only because they are sources of weakness (since they displace vermiculite flakes lying in overlapping and contacting relationship) but because they are not effective against transmission of radiant heat.

Moreover, they produce objectionable shrinkage and cracking.

The vermiculite flakes are particularly susceptible to disturbance during settling and orientation because of their relatively light weight (7 to 9 pounds per cubic foot as against 20 to 30 pounds for other flaked materials such as graphite), and it is therefore, of more than ordinary importance that cross currents or local eddies in the slurry be avoided. If the flakes be disturbed as they are settling so that they do not lie parallel to each other but lie transversely to their intended position, the material has practically no strength in such regions and, of course, will have very little value as an insulator against radiant heat.

One method of molding the material to avoid such disturbance and to produce a material in which the vermiculite flakes lie parallel to each other in closely felted relationship, is disclosed in my Patent 2,311,588 of which my co-pending application is a division. As there shown the slurry is introduced into a mold whose shape is that of the desired product. For rectangular blocks the mold is similar to a rectangular box and is perforated at its bottom upon which rests a filter screen or cloth to permit filtering out of the liquid. Depth of the mold is somewhat greater than the final thickness of the final slab in order to hold a volume of slurry containing enough solids to form a slab of the desired thickness. The opposite or top side of the mold is closed by a follower plate which slidably fits inside of the mold preferably with such closeness as to permit maintenance of some slight pressure and to avoid such leakage between the edges of the plate and the mold as to set up disturbing currents inside the mold. The mold is first filled with slurry to the necessary depth, and as the water pases through the filter bottom of the mold, the follower plate is advanced to prevent entrance of air to replace the water which has filtered out and with sufficient pressure to cause the solid materials to shift so as to fill the voids left by the water. Any air carried into the mold with the slurry should be allowed to come off before molding since the entrapped air would be under slight pressure during de-watering and on release of pressure would cause local disruption inside the material or during the molding would escape at the point of least resistance, leaving a weak spot in the material. The pressure is carefully limited to avoid such pressure as would substantially disrupt the internal structure of the material. This may readily be accomplished by advancing the follower plate by pneumatic or hydraulic pressure of limited intensity, thereby insuring against exceeding safe pressure. In the present instance a pressure of twenty to thirty pounds per square inch on the material has proved sufficient to accomplish the desired result without damaging the material. I have found that such slight pressure materially reduces drying shrinkage and cracking by elimination of substantial voids and reduction of water content prior to drying. The pressure, of course, also hastens de-watering. For a block five and one-half inches in thickness, the de-watering time is from sixty to eighty minutes depending on fineness of the vermiculite flakes.

The follower plate may advantageously be provided with a filter face similar to that of the bottom of the mold to permit de-watering through both faces and also to permit prior to molding, ready escape of air rising from the slurry.

As the water leaves the mold the vermiculite flakes settle in oriented position along the filtering face of the mold with their flat faces parallel to such face of the mold and in overlapping felted relationship. They progressively build up in this manner until completion of de-watering to a slab of the desired thickness. It is of the greatest importance to avoid disturbance of the vermiculite flakes during orienting and overlapping. For that purpose the advance of the follower is controlled so as to avoid any currents of water in the mold by causing the water to escape over the entire filter face of the mold. This distribution of escape of water prevents local currents of disturbing intensity. Also simultaneously with the escape of water, the pressure of the follower plates causes such shifting of the material as to fill the voids left by the water without, however, disturbing the orientation of the flakes. The increase in friction or roughening of the surfaces of the flakes produced by the aforesaid heat treatment, while microscopic in character, is nevertheless substantial in effect. Whereas the untreated flakes have little mutual friction, being in the nature of a lubricant like flake graphite, the treated flakes have substantial friction which though noticeable by feel is much more evident in the increase in strength of the molded material resulting from the resistance of the flakes to slipping over each other. The change in the material is also indicated by a change in color of the vermiculite flakes. This change in color may be due merely to a change in the light reflection from the microscopically roughened surfaces or to the chemical change produced by the prolonged heating which results in the roughened surface.

The cementing materials, in this case lime and silica (in this case diatomaceous earth), are not carried out with the water. The fibre tends to prevent segregation of the cementing materials as well as to facilitate de-watering.

It is not necessary to employ suction to hasten de-watering, indeed it is desirable to avoid suction to prevent interference with orientation of the vermiculite flakes and to prevent entrance of air. If suction be used, provision should be made to replace abstracted water with solid materials and not air and care should be exercised to prevent concentration of suction-induced pressure at a point of least resistance in the material, otherwise there is likely to be a rush of water out of the mold in a region of least resistance and consequent disturbance in orientation of the flakes and production of weak spots in the material.

The material produced by the above described process contrasts with the material of my Patent 2,204,581 in that air does not replace the water removed. There are no voids. Moreover in the process of making the material of said patent it was essential that the vermiculite float in the slurry. In the present process it must settle. The extreme thinness of the flakes results in a much more intimate felting contact which together with their increased mutual friction greatly increases strength, as compared with my former material wherein the granular character of the material, even though oriented, precluded substantial felting strength. In the present material there is a marked reduction of over all shrinkage and shrinkage cracks which characterize most porous materials at high temperatures. The very extensive orientation of flakes in my present material results in a substantially better K-factor than in my former material.

After molding is completed the slab is removed from the mold and subjected to a heating and drying action. The heat promotes reaction between the hydrated lime (in solution) and the silica to form calcium silicate which is a cement. The relatively large surface area provided by the diatomaceous earth brings about much more extensive reaction than would occur with other forms of silica having a small surface area in relation to mass, thereby permitting a substantial reduction in amount of lime and silica necessary to produce a given amount of bonding agent. The formation of calcium silicate can also be increased by heating the slabs under pressure, e. g., 150 pounds steam pressure, in order to develop higher pressures inside the slab in the presence of moisture. Mere increase in the temperature of the drier (at atmospheric pressure) does not have the same result since the internal temperatures of the material would not exceed that of 212° F. until the water had been evaporated, after which reaction would be very slow. If heating under steam pressure be resorted to, the slabs are subsequently dried in an ordinary drier to eliminate residual moisture.

After the material has been dried, it is superficially trimmed or faced to provide true surfaces and square corners. This material has a K-factor of .64 at 500° F. and .83 at 1200° F. The material weighs about nineteen pounds per cubic foot as compared with twenty four pounds per cubic foot for bonded diatomaceous earth. It is made of less expensive materials at no greater cost of manufacture than other molded so-called refractory insulation. It is characterized by absence of substantial voids and by fine vermiculite flakes (30 to 70% of which will pass a 65 mesh screen) about 90% of which are in parallel oriented relationship and in intimate overlapping and felting contact and which have a high frictional resistance against relative slipping.

One satisfactory form of such material comprises the following proportions by weight:

| | Percent |
|---|---|
| Exfoliated vermiculite flakes | 65.4 |
| Silica, such as diatomaceous earth | 15.7 |
| Hydrated lime | 12.8 |
| Long fibre asbestos | 6.1 |

I have found that the lime content need not be equal to that of the diatomaceous earth and may be somewhat lower than the latter without loss of strength.

One satisfactory form of asbestos has a Canadian grading of 0—2—8—6. If the insulating material is likely to be subjected to temperatures in excess of 1400° F. it is preferable, in order to minimize shrinkage at such high temperatures to calcine the diatomaceous earth at approximately 2000° F.

Water is used in an amount to form a relatively thin slurry. For each one hundred pounds of exfoliated vermiculite from one hundred to three hundred gallons of water are generally employed.

Obviously the invention is not limited to the details of the illustrative process herein disclosed. Moreover it is not indispensable that all features of the invention be used conjointly since various features may be used to advantage in different combinations and subcombinations.

Having described my invention, I claim:

1. An unfired refractory insulation efficient at temperatures of 1800° F. comprising a molded body having as its major ingredient a quantity of very thin flakes of exfoliated vermiculite of such thinness that they are no longer buoyant and of such fineness that 30% to 70% will pass a 65-mesh screen, said quantity of vermiculite being of greater weight than the combined weights of all the other ingredients of the molded body and said flakes being arranged so that substantially 90% thereof are generally parallel to each other and overlap in frictional felting relation to provide the major strength of the body and exclude substantial voids between the flakes, the surfaces of the flakes having substantially increased mutual friction over that of untreated flakes by being heated to substantially 1800° F., and said molded body including also a small amount of calcium silicate cement between the flakes comprising the reaction product of quantities of silica and lime each not substantially exceeding one-quarter of the weight of the quantity of vermiculite, said cement supplementing the felted strength of the body but being insufficient alone to bond the flakes into a coherent form.

2. An unfired refractory insulation efficient at high temperatures against radiant heat comprising a molded body having as its major ingredient a quantity of felted very thin exfoliated vermiculite flakes, said flakes being so thin that they are no longer buoyant and being of such size that 30% to 70% will pass a 65-mesh screen, substantially 90% of said flakes being oriented so as to lie substantially parallel to a base of the body and in overlapping felted contact and without substantial voids between the flakes, said quantity of vermiculite being of greater weight than the combined weights of all the other ingredients of the molded body, the surfaces of the flakes having their mutual friction substantially increased over that of untreated flakes as a result of being heated to substantially 1800° F., thereby substantially increasing the felted strength of the material, said body containing a minor amount of calcium silicate cement between the flakes comprising the reaction product of quantities of silica and lime each not substantially exceeding one-quarter of the weight of the quantity of vermiculite which aids in increasing the strength of the body but is insufficient in itself to give the body any substantial strength, said body having a K-factor of substantially .8 at 1200° F. and weighing substantially 19 pounds per cubic foot.

3. An unfired refractory insulation efficient at high temperatures against radiant heat comprising a molded body including substantially 65.4% by weight exfoliated vermiculite flakes of such thinness that they are no longer buoyant and of such fineness that 30% to 70% will pass a 65-mesh screen and being arranged in the body so that substantially 90% thereof are generally parallel to each other and overlap in frictional felting relation to provide the major strength of the body and exclude substantial voids between the flakes, the surfaces of the flakes having substantially increased mutual friction over that of untreated flakes by being heated to substantially 1800° F., said body including also a small amount of calcium silicate cement between the flakes comprising the reaction product of substantially 15.7% by weight silica and 12.8% by weight hydrated lime supplementing the felted strength of the body but being insufficient alone to bond the flakes into a coherent form, and said body including also substantially 6.1% by weight long fibre asbestos dispersed therethrough.

PAUL S. DENNING.

REFERENCES CITED

The following references are of record in the file of this patent:

UNITED STATES PATENTS

| Number | Name | Date |
|---|---|---|
| 620,476 | Miechell | Feb. 28, 1899 |
| 1,356,309 | Pike | Oct. 19, 1920 |
| 1,812,306 | Russ | June 30, 1931 |
| 1,963,276 | Miner et al. | June 19, 1934 |
| 2,017,344 | Ellis | Oct. 15, 1935 |
| 2,017,904 | Keeth | Oct. 22, 1935 |
| 2,030,239 | Byers | Feb. 11, 1936 |
| 2,175,715 | Denning | Oct. 10, 1939 |
| 2,204,581 | Denning | June 18, 1940 |
| 2,326,517 | Brown | Aug. 10, 1943 |
| 2,382,290 | Callander | Aug. 14, 1945 |

FOREIGN PATENTS

| Number | Country | Date |
|---|---|---|
| 485,504 | Great Britain | May 20, 1938 |
| 485,505 | Great Britain | May 20, 1938 |